United States Patent
Morikage et al.

(10) Patent No.: US 6,931,394 B2
(45) Date of Patent: Aug. 16, 2005

(54) LAW RETRIEVAL SYSTEM, LAW RETRIEVAL APPARATUS AND LAW RETRIEVAL PROGRAM

(75) Inventors: Norihito Morikage, Sapporo (JP); Takayuki Sakurai, Sapporo (JP)

(73) Assignee: Tonfu Corporation, Sapporo (JP)

( * ) Notice: Subject to any disclaimer, the term of this patent is extended or adjusted under 35 U.S.C. 154(b) by 713 days.

(21) Appl. No.: 09/826,176

(22) Filed: Apr. 4, 2001

(65) Prior Publication Data

US 2002/0052863 A1 May 2, 2002

(30) Foreign Application Priority Data

Oct. 31, 2000 (JP) ........................................ 2000-333931

(51) Int. Cl.[7] ............................................. G06F 17/30
(52) U.S. Cl. ...................................................... 707/3
(58) Field of Search ................................. 707/1, 3, 100

(56) References Cited

U.S. PATENT DOCUMENTS

| | | | | |
|---|---|---|---|---|
| 5,371,807 A | * | 12/1994 | Register et al. | 382/159 |
| 5,893,101 A | * | 4/1999 | Balogh et al. | 707/100 |
| 6,047,300 A | * | 4/2000 | Walfish et al. | 715/533 |
| 6,353,827 B1 | * | 3/2002 | Davies et al. | 707/6 |
| 6,401,073 B1 | * | 6/2002 | Tokuda et al. | 705/8 |
| 6,651,253 B2 | * | 11/2003 | Dudkiewicz et al. | 725/114 |

FOREIGN PATENT DOCUMENTS

JP H11-306191 11/1999

OTHER PUBLICATIONS

Michael P. Oakes & Malcolm J. Tayloyr Discloses, a method of automated assistance in the formulation of search statements for bibliographic databases.*

* cited by examiner

Primary Examiner—Frantz Coby
Assistant Examiner—Haythim Alaubaidi
(74) Attorney, Agent, or Firm—Koda & Androlia (57) ABSTRACT

The present invention is a law retrieval apparatus composed of: data storage means including a constitution and statute database and a judicial case database, and including at least one database out of a meta-keyword database, a verb and object database, and an aid flow database; and a law retrieval server including, in correspondence with each database accumulated in the data storage means, at least one retrieval processing means out of meta-keyword retrieval processing means for reading a retrieval keyword associated with a non-retrieval keyword received from the meta-keyword database to perform retrieval processing, verb and object retrieval processing means for reading a retrieval keyword associated with a combination of the received verb and object from the verb and object database to perform retrieval processing, and aid flow retrieval processing means, when a retrieval pattern matches a pattern of an aid flowchart, for requesting additional information in accordance with the flowchart.

7 Claims, 7 Drawing Sheets

《 AN EXAMPLE OF META-KEYWORD DATABASE 》

| NON-RETRIEVAL KEYWORD | RETRIEVAL KEYWORD |
|---|---|
| SHOPLIFT | CRIMINAL LAW, ROBBERY, THEFT, ... |
| OYAJIGARI | CRIMINAL LAW, VIOLENCE, INJURY, HOMICIDE, ROBBERY, THREAT, ... |
| CHARITY | INCOME TAX LAW, CORPORATION TAX LAW, RELIGIOUS JURIDICAL PERSON, TAX EXEMPTION, ... |
| TRAFFIC ACCIDENT | ROAD TRAFFIC ACT, CRIMINAL LAW, CIVIL LAW, COMPENSATION FOR DAMAGES, BODILY INJURY AND DEATH BY NEGLIGENCE IN THE CONDUCT OF BUSINESS, ... |
| DIVORCE | CIVIL LAW, CONSOLATION MONEY, DISTRIBUTION OF PROPERTY, COMPROMISE, MEDITATION, DOMESTIC COURT, INCOME TAX LAW, ... |
| SNEAK THIEF | THEFT, CHARGE OF THEFT, ROBBERY, BURGLARY, ... |
| PAWNBROKER | REPAYMENT, MULTIPLEX DEBT, BANKRUPTCY, SECURITY MONEY, DEBT, INTEREST, ... |

F I G. 3

《AN EXAMPLE OF DATABASE OF RETRIEVAL KEYWORD GROUP BY COMBINATION OF VERB AND OBJECT》

| VERB / OBJECT | RECEIVE | STEAL | OBTAIN | DISSOLVE | RETURN | ... |
|---|---|---|---|---|---|---|
| PROPERTY | DONATION TAX, INHERITANCE TAX, DISTRIBUTION OF PROPERTY, ... | CRIMINAL LAW, THEFT, ROBBERY, BURGLARY, ... | DONATION TAX, INHERITANCE TAX, DISTRIBUTION OF PROPERTY, ... | | CIVIL LAW, UNFAIR PROFIT RETURN, ... | ... |
| DISTRIBUTION OF PROPERTY | ... | | ... | | | |
| EXPENSE OF BRINGING UP | ... | | ... | | | |
| LIVING EXPENSES | ... | | ... | | | |
| CHILDREN | | CRIMINAL LAW, MINOR, ABDUCTION, KIDNAPPING, ... | ... | | ... | |
| MARRIAGE | | | | ... | | |
| ENGAGEMENT | | | | ... | | |
| CONSOLATION MONEY | | | | | | |
| ... | | | | | | |

FIG. 4

《 AN EXAMPLE OF AID DATABASE 》

| AID FLOW IDENTIFICATION NUMBER | AID FLOWCHART APPLICATION CONDITIONAL EXPRESSION | BRANCH-TYPE FILE |
|---|---|---|
| 001 "TRAFFIC ACCIDENT" | (RAN OVER OR WAS RUN OVER OR HUMAN BODY OR TRAFFIC) AND ACCIDENT | carac-01.tpl |
| 002 "DIVORCE-CONSOLATION MONEY" | (SEPARATION OR WIFE OR HUSBAND OR DIVORCE) AND CONSOLATION MONEY | devoce-01.tpl |
| ... | ... | ... |

FIG. 5

《 AN EXAMPLE OF BRANCH-TYPE FILE OF AID FLOWCHART 》

| LINE NUMBER | QUERY AND RESULT FILE | BRANCH NUMBER | | |
|---|---|---|---|---|
| 1 | f001-q001.html | 2 | 3 | |
| 2 | f001-q002.html | 4 | 5 | |
| 3 | f001-q003.html | 10 | 11 | 12 |
| 4 | f001-q004.html | 20 | 22 | 49 |
| 5 | f001-q005.html | 39 | 49 | 19 |
| 10 | f001-q006.html | 11 | 12 | |
| 11 | f001-q007.html | 19 | 49 | |
| 12 | f001-q008.html | 19 | 39 | |
| 19 | f001-q001.html | | | |
| 20 | f001-q009.html | 21 | 29 | |
| 21 | f001-q010.html | 22 | 29 | |
| 22 | f001-q011.html | 39 | 49 | |
| 23 | f001-q012.html | 29 | 39 | |
| 29 | f001-q002.html | | | |
| 39 | f001-q003.html | | | |
| 49 | f001-q004.html | | | |

Kenpou.net

▼ CONSTITUTION·     CASE-BY-CASE     JUDICIAL PRECEDENT
   ALL TEXT RETRIEVAL     RETRIEVAL     RETRIEVAL

KEYWORD | SHOPLIFT | ··· RETRIEVAL

NUMBER OF DISPLAYS: 20 ▼     POINT DISPLAY: EXIST ▼

---

現在、688のファイルがインデックス化され、5,932個のキーワードが登録されています。
インデックスの最終更新日：

---

検索結果

参考ヒット数：[ 盗難 : 22 ]

検索式にマッチする22個の文書が見つかりました。

1.15 憲法 - 第94条〔手形の喪失・盗難の場合の手続に関する準拠法〕為替手形又ハ約束手形ノ喪失又ハ盗難ノ場合ニ為スベキ手続ハ支払地ノ属スル国ノ法律ニ依リ之ヲ定ム (score:34)
    Date：*Wed, 23 Aug 2000 08:27:34*
    第94条〔手形の喪失・盗難の場合の手続に関する準拠法〕為替手形又ハ約束手形ノ
    喪失又ハ盗難ノ場合ニ為スベキ手続ハ支払地ノ属スル国ノ法律ニ依リ之ヲ定ム *小
    切手の場合(小八〇(8))、除権判決(民施五七、公催仲裁七
    http://www.kenpou.net/hanrei/Hanrei/data/15-94.html size(618 bytes)

2.04 憲法 - 第72条(雑損控除) (score:2)
    Date：*Wed, 23 Aug 2000 08:26:59*
    第72条(雑損控除)居住者又はその者と生計を一にする配偶者その他の親族で制令で
    定めるものの有する資産(第六十二条第一項(生活に通常必要でない資産の災害によ
    る損失)及び第七十条第三項(被災事業用資産の損失の金
    http://www.kenpou.net/hanrei/Hanrei/data/04-560.html size(1,689 bytes)

3.01 憲法 - 第20条(過料の裁判の管轄) (score:2)
    Date：*Wed, 23 Aug 2000 08:26:56*
    第20条(過料の裁判の管轄)過料の裁判は、簡易裁判所が行なう。附・則 1 この法律
    は、日本国との平和条約の最初の効力発生の日〔昭二七・四・二八〕から施行する。
    但し、第十四条及び第十八条第一項第八号の規定、
    http://www.kenpou.net/hanrei/Hanrei/data/01-329.html size(7,606 bytes)

4.01 憲法 - 第7条(登録証明書の再交付) (score:2)
    Date：*Wed, 23 Aug 2000 08:26:56*
    第7条(登録証明書の再交付)外国人は、紛失、盗難又は滅失により登録証明書を失つ
    た場合には、その事実を知ったときから十四日以内に、その居住地の市町村の長に対
    し、次に揚げる書類および写真を提出して、登録証明書
    http://www.kenpou.net/hanrei/Hanrei/data/01-309.html size(1,535 bytes)

FIG. 8

LAW RETRIEVAL SYSTEM, LAW RETRIEVAL APPARATUS AND LAW RETRIEVAL PROGRAM

BACKGROUND OF THE INVENTION

1. Field of the Invention

The present invention relates to a law retrieval system, a law retrieval apparatus, and a law retrieval program and, more specifically, to a law retrieval system, a law retrieval apparatus, and a law retrieval program suitable for retrieving what provision in the civil law or in the criminal law applies, how a past judicial case was ruled, or the like in case of an encounter with a case such as a traffic accident, robbery, or the like.

2. Description of the Related Art

We sometimes have situations that require access to the constitution, laws, judicial cases, or the like in daily life or simply want to get some knowledge. For example, we may want to know the constitution, laws, judicial cases, or the like, naturally, in the case in which we are deceived by multilevel marketing schemes, or meet with traffic accidents or burglary or robbery cases, and we sometimes want to have some knowledge on the assumption that we may meet with those situations in the future. Further, we may want to understand law on sensational topics in more detail, or want to study law for business transactions. In such cases, generally, we leave such inquiries to lawyers because legal knowledge is difficult to understand, we read law books such as the thick Statute Books on our own, or we may retrieve information from CD-ROMs onto which law provisions are recorded through the use of computers.

In a conventional law retrieval method, however, when we consult law books such as the Statute Books or the like, it is difficult to determine without omission which matters may related to what we want to know whether in, civil law, criminal law, or commercial law, and further it takes a considerably long time to obtain a desired result if we do not know what provision is the ground may be. Furthermore, there is the problem that it is often hard to understand the provision sufficiently because of a lot of terms difficult to understand.

Moreover, when we retrieve information though computers using the use of CD-ROMs, we must enter appropriate retrieval keywords, and thus we need to know technical terms on law, such as law terms difficult to understand in provisions and terms used in judicial cases. If no appropriate keyword is entered, there is the problem that we can not obtain a retrieval result, or the result is not what we expected or entirely satisfactory.

In such cases, we often do not necessarily have acquaintances who are conversant with legal knowledge on the one hand, and matters are often not serious enough to be left to lawyers on the other hand.

SUMMARY OF THE INVENTION

The present invention is carried out in view of the above problems to solve at least one of the problems and its object is to provide a law retrieval system, a law retrieval apparatus, and a law retrieval program capable of easily retrieving a desired provision and judicial case from a slang word and the like without knowledge of retrieval keywords such as technical terms on law, capable of easily and speedily performing retrieval from a combination of a verb and object, and further capable of leading a desired result by a user answering in sequence by making a choice among adequate choices without inputting many retrieval keywords by himself.

The present invention is characterized by comprising: data storage means which includes a constitution and statute database in which data of the constitution, laws, government orders and ministerial orders, and the like is accumulated, a judicial case database in which data of judicial cases is accumulated, and at least one database out of a meta-keyword database constructed by associating non-retrieval keywords such as slang words with retrieval keywords adequate for replacing the non-retrieval keywords, a verb and object database constructed by associating verbs and objects related to each other and associating retrieval keywords related to combinations of them, and an aid flow database previously constructed as aid flowcharts by predicting information gathering query patterns for cases; and, in correspondence with each database accumulated in the data storage means, at least one retrieval processing means out of meta-keyword retrieval processing means, when a received keyword is a non-retrieval keyword, for reading an associated retrieval keyword from the meta-keyword database to perform retrieval processing, verb and object retrieval processing means for reading a retrieval keyword associated with a combination of a received verb and object from the verb and object database to perform retrieval processing, and aid flow retrieval processing means, when a retrieval pattern by a received retrieval keyword matches a pattern of an aid flowchart, for transmitting requests for additional information in sequence in accordance with a flow of the aid flowchart.

Through the employment of the above-described configuration of the invention, the meta-keyword retrieval processing means replaces a non-retrieval keyword with a retrieval keyword using the meta-keyword database to perform retrieval processing, the verb and object retrieval processing means obtains a combination of a verb and object which are associated with each other using the verb and object database to perform retrieval processing based on the retrieval keyword associated therewith, and the aid flow retrieval processing means provides a user choices in a query format to draw a final conclusion using the aid flow database. Therefore, the user can retrieve a desired provision and judicial case without knowledge of technical terms on law, can easily and speedily perform retrieval from the combination of the verb and object, and further are presented with adequate choices without entering many retrieval keywords by himself, whereby more accurate and useful information and advice can be provided to the user.

Further, the present invention is characterized by including a meta-keyword database constructed by associating non-retrieval keywords such as slang words with retrieval keywords adequate for replacing the non-retrieval keywords; an information analysis portion for determining whether or not a received keyword is a non-retrieval keyword; and a retrieval processing portion, when the determination by the information analysis portion is a non-retrieval keyword, for reading an associated retrieval keyword therewith from the meta-keyword database to perform retrieval processing.

Through the employment of the above-described configuration, the information analysis portion determines whether or not the received keyword is a non-retrieval keyword, and when it is a non-retrieval keyword, the retrieval processing portion reads a retrieval keyword associated with the non-retrieval keyword from the meta-keyword database to perform retrieval processing, making it possible to obtain a retrieval result of a desired law provision and judicial case without knowledge of retrieval keywords composed of law terms or the like.

Further, the present invention is characterized in that the meta-keyword database is set such that the non-retrieval keyword and a law term having meaning equal or similar thereto as the retrieval word associated with the non-retrieval keyword are one-to-one or one-to-many.

The employment of the above-described configuration makes it possible to obtain a retrieval result to the point without retrieval omission even though a non-retrieval keyword is a polysemic word including many meanings.

Further, the present invention is characterized by comprising: a verb and object database constructed by associating verbs and objects related to each other and by associating retrieval keywords related to combinations of them, and a retrieval processing portion for obtaining a retrieval keyword associated with a combination of a received verb and object from the verb and object database to perform retrieval processing.

Through the employment of the above-described configuration, when receiving a verb and object which are related to each other, the retrieval processing portion obtains a retrieval keyword associated with a combination of them from the verb and object database to perform retrieval, thereby making it possible to obtain a predetermined retrieval keyword only from the combination of the verb and object to perform easy and speedy retrieval processing.

Further, the present invention is characterized by further comprising an information analysis portion for analyzing whether a received keyword is a verb or object, and an input/output processing portion, when an analysis result by the information analysis portion is either a verb or object, for reading the other object or verb associated therewith from the verb and object database and outputting it, wherein the retrieval processing portion receives the other verb or object after the output by the input/output processing portion to obtain a retrieval keyword associated with a combination of the verb and object from the verb and object database to perform retrieval processing.

Through the employment of the above-described configuration, the information analysis portion analyzes a received keyword to determine whether a verb or object, the input/output processing portion reads an object or verb associated with the verb or object from the verb and object database and outputs it to a user information transmitter-receiver, and the retrieval processing portion receives the verb or object entered via the user information transmitter-receiver to obtain a retrieval keyword associated with a combination of the verb and object to perform retrieval processing, thereby making it possible to retrieve speedily a law provision and judicial case on a problem, which the user has, only from the verb and object.

Further, the present invention is characterized by comprising: an aid flow database previously constructed as aid flowcharts by predicting information gathering query patterns for cases; a history analysis portion for analyzing whether or not a retrieval history matches any one of patterns of the aid flowcharts; and an input/output processing portion, when the matching of the retrieval pattern is determined by the history analysis portion, for outputting requests for information in sequence in accordance with the pattern of the aid flowchart.

Through the employment of the above-described configuration, the history analysis portion analyzes a retrieval pattern from the retrieval history in received information and when it matches a pattern of an aid flowchart of the aid flow database, the input/output processing portion requests the user to enter additional information in sequence in accordance with the applicable aid flowchart, thereby providing more accurate and useful information and advice, so that the user can obtain the same effect as if he had gone to an expert in law for advice.

Further, the present invention is characterized in that, in the aid flow database, at least aid flow application conditional expressions are accumulated associated with the aid flowcharts.

The employment of the above-described configuration makes it possible to optionally set application conditions of aid flowcharts, thereby enabling more accurate retrieval of law and the like.

Further, the present invention is characterized in that the aid flowchart is composed of identification line numbers including identification information, query files in which queries including choices are written, result files in which answer results are written, and branch numbers in which identification line numbers of next destinations are recorded associated with choices of the query files.

Through the employment of above-described the configuration, the aid flowcharts are branched to query files and result files, and choices included in the query files are associated with identification line numbers of files, thereby realizing exchange of information with the user in sequence in accordance with an aid flowchart, and branching to the files facilitates rewriting and addition of contents in the files.

Further the present invention is characterized in that the identification line number includes identification information as to a query file or a result file.

The employment of the above-described configuration enables identification as to whether the file outputted to the user is a query file or a result file of an aid flowchart, so that, for example, the instantaneous determination that the file is a query file can shorten the time to output of the next query file, and the determination that the file is a result file can eliminate unnecessary excessive access to the aid flow database, resulting in realization of efficient retrieval processing.

Further the present invention is characterized by recording therein data comprising: a branch-type file structure composed of an identification line number including identification information, a query file in which queries including choices are written, a result file in which a result is written, and a branch number in which identification line numbers of next destinations are written associated with the choices of the query file, constituting an aid flowchart by predicting an information gathering query pattern for each case; and a file structure of an aid flow application conditional expression associated with a branch-type file of each aid flowchart.

Through the employment of the above-described configuration, the structure, in which the aid flowcharts are branched to query files and result files and choices included in the query files are associated with identification line numbers of files, can realize exchange of information with the user in sequence in accordance with an aid flowchart, and branching to the files facilitates rewriting and addition of contents in the files, and the file structure of an aid flow application conditional expression associated with a branch-type file can facilitate determination of start of aid flowchart application.

DETAILED DESCRIPTION OF THE PREFERRED EMBODIMENT(S)

An embodiment of a law retrieval system, a law retrieval apparatus and a law retrieval program according to the present invention will be explained hereinafter using the drawings.

The law retrieval system in this embodiment provides laws, judicial cases, and the like by personal computers or portable remote terminals via various communication networks such as the Internet, a computer network, or the like.

The laws include overall information related to laws such as the Constitution of Japan, the civil law, the criminal law, the commercial law, the patent law, and other laws, cabinet orders, ministerial ordinances, foreign laws, international customs, treaties, and judgements in domestic courts, district courts, high courts, the Supreme Court, and the like. Incidentally, the foreign laws include, for example, the U.S. Federal Law, state laws, and the like.

Figure 1:
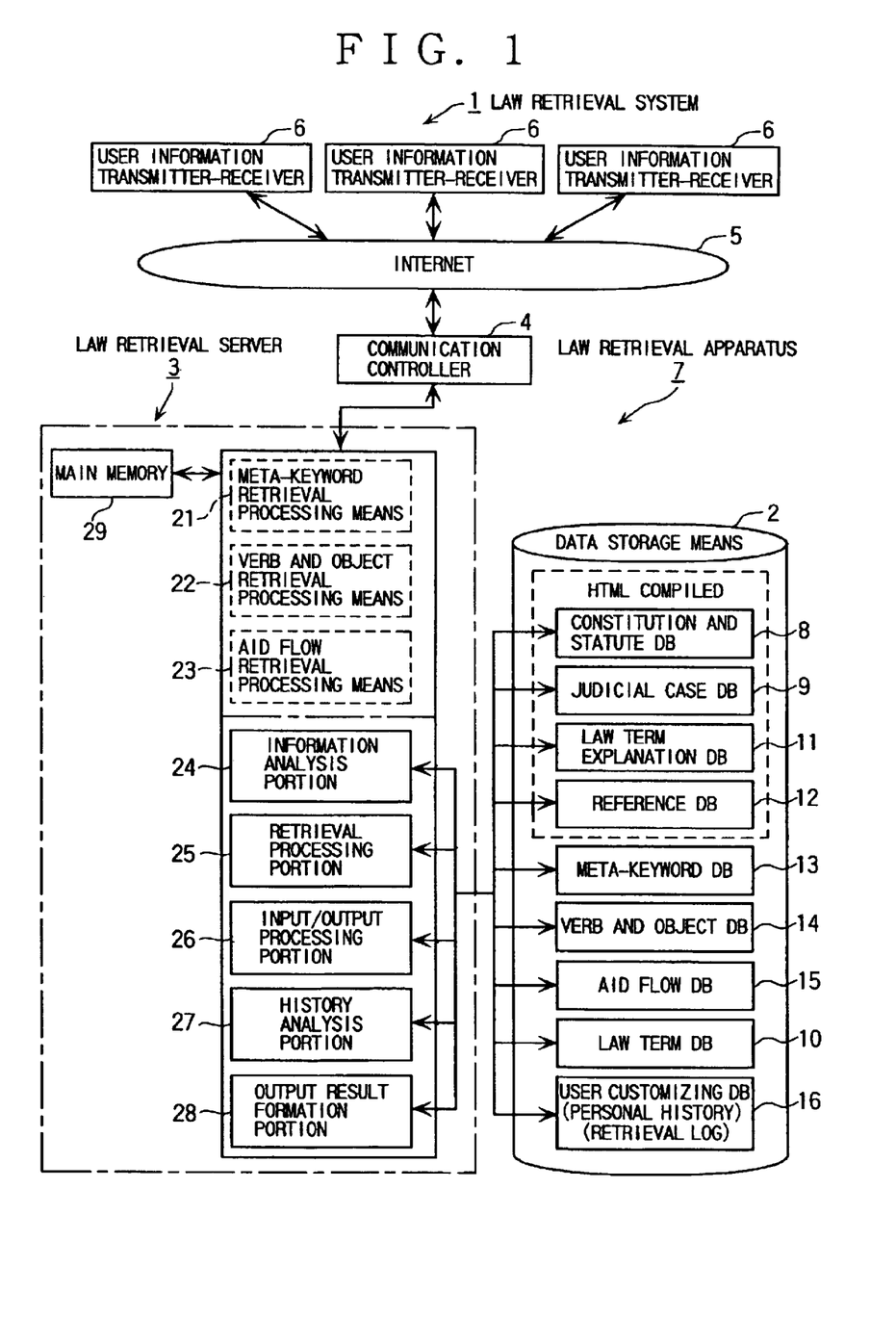
FIG. 1 is a system configuration diagram showing an embodiment of a law retrieval system according to the present invention.

As shown in FIG. 1, a law retrieval system 1 of this embodiment, in which a law retrieval server 3 that is the WWW server is linked to data storage means 2 such as a hard disc on which data on laws and data necessary for retrieval are accumulated, performs information transmission and reception control by the use of a communication controller 4 such as a router and provides information such as law provisions and juridical cases matching retrieval conditions from users to user information transmitter-receivers 6 via the Internet 5.

The data storage means 2 and the law retrieval server 3 constitute a law retrieval apparatus 7.

The data storage means 2, a storage portion provided internally or externally with, for example, a hard disc corresponding thereto, includes a constitution and statute database 8 in which provision data of the constitution, laws, government orders and ministerial orders, and the like is accumulated, a judicial case database 9 in which data on judicial precedents and other judicial cases is accumulated, a law term database 10 in which law terms are accumulated, a law term explanation database 11 in which data on definition and detailed explanation of the law terms accumulated in the law term database 10 is accumulated, a reference database 12 in which various reference data such as columns, remarks, backgrounds of judicial cases is accumulated, a meta-keyword database 13 constructed by associating non-retrieval keywords such as slang words with retrieval keywords adequate for replacing the non-retrieval keywords, a verb and object database 14 constructed by associating verbs and objects related to each other and associating retrieval keywords related to combinations of them, an aid flow database 15 previously constructed as aid flowcharts by predicting information gathering query patterns for cases, and a user customizing database 16 in which personal histories and retrieval logs of users are accumulated.

Explaining above-described each database in more detail here, the constitution and statute database 8, the judicial case database 9, the law term explanation database 11, and the reference database 12 are previously formed in HTML files and compiled in a state in which link is also made among them to provide information speedily at any time. The constitution and statute database 8 and the judicial case database 9 are hyperlinked to the law term explanation database 11 via the law term database 10. For example, law terms in provisions and judicial decisions are linked to the law term explanation database 11, so that when a user clicks a mouse or the like on a difficult law term through the use of the user information transmitter-receiver 6, the law term explanation database 11 is accessed via the law retrieval server 3 to output word or phrase explanation associated with the law term to the user information transmitter-receiver 6.

The constitution and statute database 8 and the judicial case database 9 are also hyperlinked to the reference database 12. For example, a remark is added in a provision or in a judicial decision, whereby when the user requests presentation of the remark through the use of a mouse or the like which is input means of the user information transmitter-receiver 6, information such as explanation of the remark or a column helpful for reading a provision or a judicial case is read from the reference database 12 via the law retrieval server 3.

Figure 2:
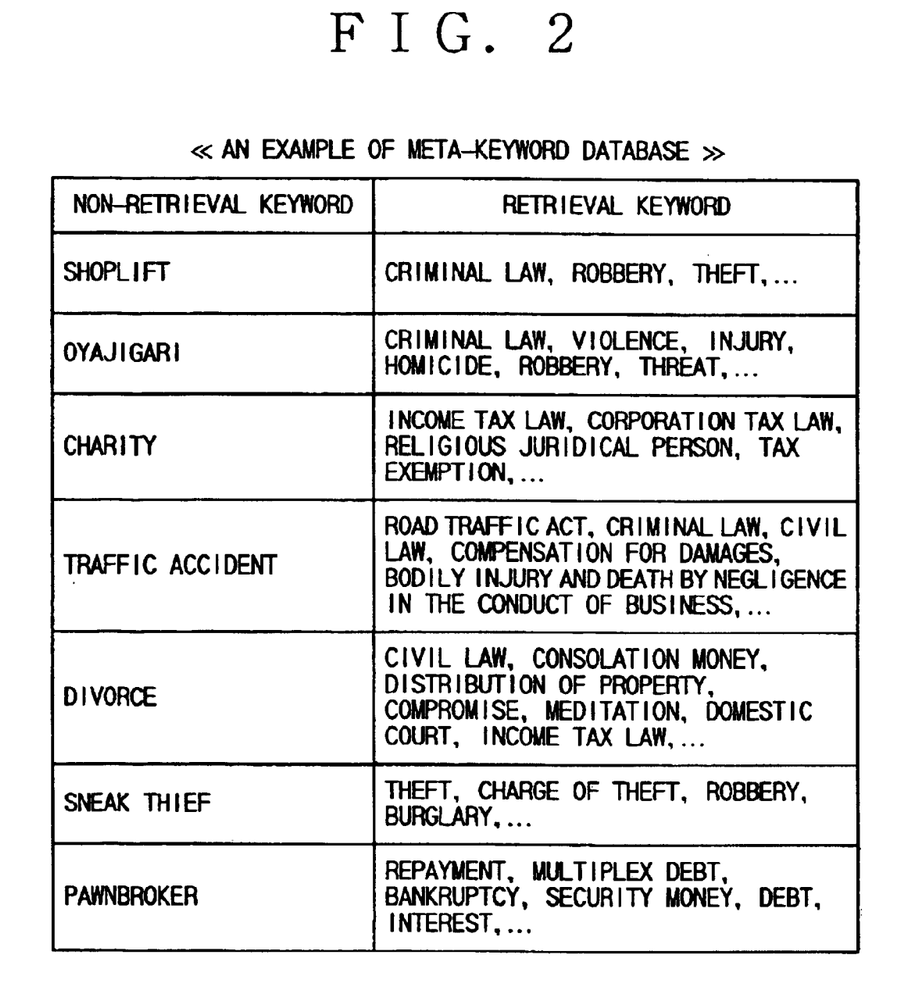
FIG. 2 is a table showing an example of a meta-keyword database in this embodiment.

In the meta-keyword database 13, non-retrieval keywords and retrieval keywords are associated to be replaceable. A meta-keyword here means a keyword given a function of splitting a non-retrieval keyword into one or more retrieval keywords for replacement. More specifically, the retrieval word is a law term having meaning equal or similar to the non-retrieval keyword such as a slang word, and the non-retrieval keyword and the retrieval keyword are set to be one-to-one or one-to-many.

For example, as shown in FIG. 2, "criminal law, robbery, theft", which are retrieval keywords, are associated with "shoplift" that is a non-retrieval keyword. A plurality of words such as "criminal law, violence, injury, homicide, robbery, threat . . . ", which are retrieval keywords, are associated with a non-retrieval keyword "oyajigari (an attack for money against a middle-aged man by a group of young men)". A plurality of words "repayment, multiplex debt, bankruptcy, security money, interest . . . ", which are retrieval keywords, are associated with a non-retrieval keyword "pawnbroker".

The use of the meta-keyword database 13 as described above bridges a gap between knowledge of law terms that the user has and knowledge of law terms necessary for retrieval. Incidentally, law terms are generally preferable as the retrieval keywords but, not necessarily limited to this, words other than law terms may be set if they are suitable for retrieval of laws and the like.

Figure 3:
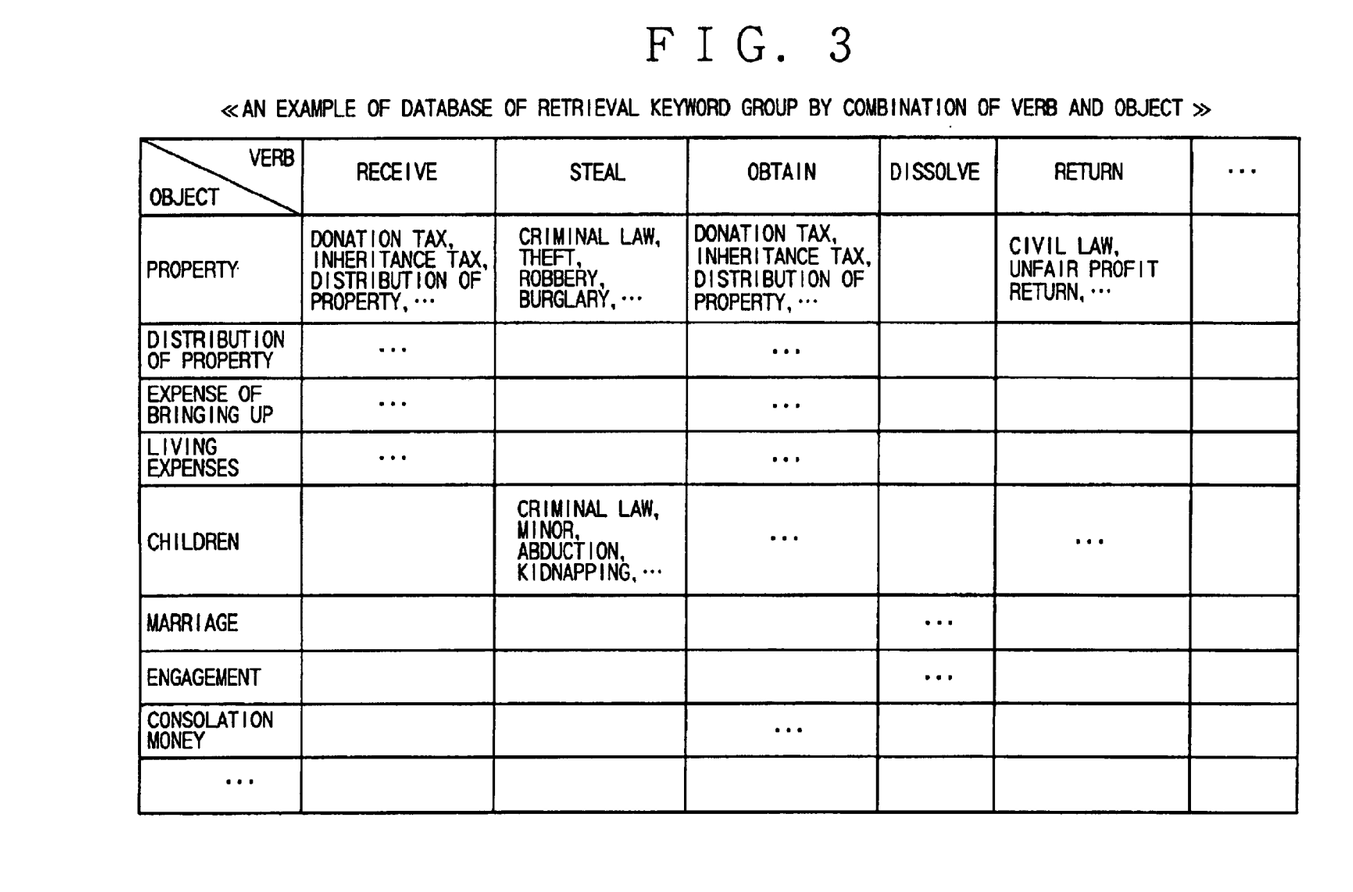
FIG. 3 is a table showing an example of a verb and object database in this embodiment.

The verb and object database 14 is constructed, as shown in FIG. 3, such that verbs and objects related to each other are arranged in a two-dimensional array and further retrieval keywords obtained from combinations of them are associated therewith. The verbs and objects are set by predicting matters and problems the users hold and breaking down the contents of the matters and problems into "verb" and "object".

For example, supposing that "What tax laws apply with the case of being given one's father's property before his death and after his death" as a problem the user holds, if the object is "property", "receive, steal, obtain, return . . . " are associated therewith as its verb. When a combination of "property" and "receive" is chosen as the combination of an object and verb, "donation tax, inheritance tax, distribution of property . . . " are set as retrieval keywords associated therewith, and thus these words can be obtained.

On the other hand, supposing that the user "receives something", when "receive" is made a target as the verb, "distribution of property, property, expense of bringing up, living expenses, consolation money . . . " are associated therewith as its object. Then, the user chooses words relating to him from this object group, thereby finally obtaining retrieval keywords from the combination of the verb and object.

As described above, subjects or the like are not always necessary in many cases when the user performs retrieval, and thus the verb and object database 14 is constructed by focusing retrieval keywords on combinations of verbs and objects to thereby realize easy and speedy retrieval in this embodiment. Incidentally, the verb and object may be optionally entered by the user, or a list may be outputted from the law retrieval apparatus 7 side and then the verb and object may be chosen and entered through the use of a mouse or the like by the user. Further, verbs and objects which users will often use are set regardless of whether or not they are law terms.

Figure 4:
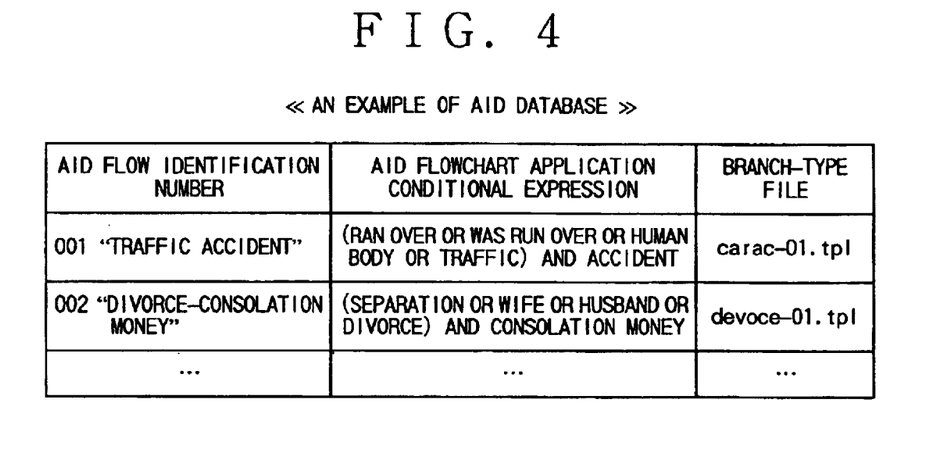
FIG. 4 is a table showing an example of an aid flow database in this embodiment.

The aid flow database 15 is previously constructed as aid flowcharts by predicting information gathering query patterns for cases. This aid flowchart is configured in a format of exchanging queries including choices to be able to reach most efficiently a conclusion such as what provision of what law some case is treated under, what a similar judgement in the past is, or the like.

For example, in the aid flow database 15, as shown in FIG. 4, aid flow application conditional expressions and aid flow identification numbers are accumulated associated with branch-type files of the aid flowcharts. The aid flowchart identification number is an identification name which is set in accordance with the contents or sort of the aid flowchart. The aid flow application conditional expression is a conditional expression suitable for determining whether or not the application of the aid flowchart is started. In this aid flow application conditional expression, as shown in FIG. 4, a complex conditional expression can be written as it is, so that the expression can be evaluated as part of a program in CGI (Common Gateway Interface), thereby enabling complex determination. This determination is made, for example, by the use of retrieval history of the Cookie function of a Web browser or by the use of a file holding registry and environmental variable of an operating system (OS).

Figure 5:
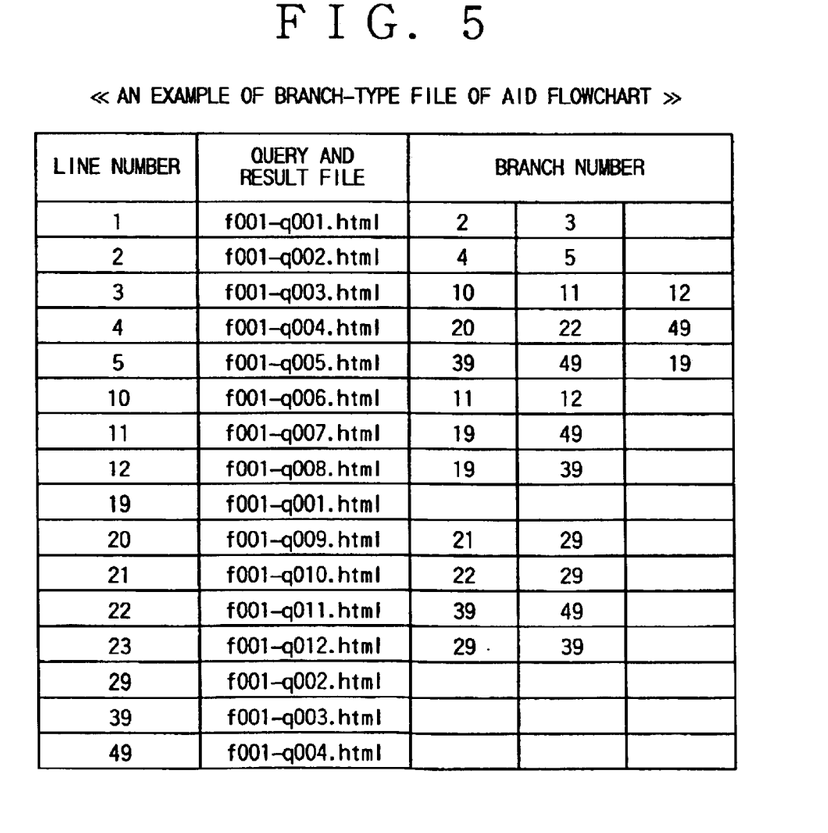
FIG. 5 is a table showing an example of a branch-type file in FIG. 4.

The branch-type file is, as shown in FIG. 5, composed of identification line numbers including identification information of query files or result files and identification information distinguishing a branch-type file from other branch-type files, query files in which query items including choices are written, result files in which answer results are written, branch numbers which record identification line numbers of next destinations associated with choices of the query files.

The above-described query file and result file are each configured in a format made by extracting part of a file displayable by HTML as a rule to facilitate rewriting and transformation. However, the result file may be formed in an HTML file itself to make it possible to display a display format to the user in a speedy pop-up format.

The reason why data is held in a structure made by extracting part of the HTML file as a rule as described above is that when it is formed as a general HTML file, there is a merit that the file can be browsed by a browser without passing through CGI by itself, thereby placing less burden on the server but, on the other hand, when alteration or addition is made in an item common to a plurality of HTML files, for example, keyword input frame, background color, design, title, directions or the like, all the HTML files including altered parts need to be modified, causing inconvenience. In this point, when common parts are extracted and held in an independent HTML format, there are advantages that modification of alteration and addition is easy, and that common data is never redundantly held in each file from the beginning, eliminating waste in data capacity. Specifically, the query file or the like needs to be added with modification as necessary to provide more suitable queries in accordance with a retrieval pattern status, and thus the file is convenient in a data file of the HTML format made by extracting part of the HTML file. Conversely, files modified less often out of the result files are formed as HTML files to decrease burden on the server to facilitate browsing.

On the other hand, the identification line numbers can be optionally decided except for a condition of never repeating, and further they are not necessarily consecutive serial numbers. In order to identify a query file or a result file, for example, the value of the first digit is set to "9" for the result file.

As the branch numbers, identification line numbers of destinations are set for choices written in the query file, for example, choice between YES and NO to a query, choice among No. 1, No. 2, and No. 3, or the like.

For instance, when the chosen answer by the user to the query file of identification line number 1 is a choice corresponding to branch number 3, the query to be next outputted to the user is the query file of identification line number 3. Subsequently, when the user makes a choice corresponding to branch number 11 to the query of the identification line number 3, the query file of identification line number 11 is outputted to the user. Further, when the user makes a choice corresponding to branch number 19 to the query of the identification line number 11, the flow advances to identification line number 19, and the branch-type file of the identification line number 19 is determined as a result file because the value of the first digit of the identification line number is "9", transmitting to the user a result file in which a conclusion, advice, or the like is written.

In the user customizing database 16, accumulated are personal histories and retrieval logs of users. More specifically, through the use of the so-called Cookie function or the like, data is temporarily written into and held in the user information transmitter-receiver 6 of a user who visits a site via the Web browser from the law retrieval server 3 side, so that the user customizing database 16 receives the data when the user visits the site again. The data is retrieval information, for example, the identification number of the user, the date and the time of the last visit to the site, the number of visits to the site, retrieval keywords in the past, aid flow identification numbers, and the like. With this information, it can be determined what step of retrieval the user visiting the site performs at present, whether or not the retrieval matches the application condition of an aid flowchart, or the like.

Next, the law retrieval server 3 will be explained. The law retrieval server 3 includes, as shown in FIG. 1, meta-keyword retrieval processing means 21 for determining whether or not a received keyword is a non-retrieval keyword and, when it is a non-retrieval keyword, for reading an associated retrieval keyword from the meta-keyword database 13 to perform retrieval processing, verb and object retrieval processing means 22 for reading an object or verb associated with the received verb or object from the verb and object database 14 to output it to the user information transmitter-receiver 6, and for performing retrieval processing based on a retrieval keyword obtained from a combination of a verb and object chosen by the answer to the above output, aid flow retrieval processing means 23, when a retrieval pattern by the received retrieval keyword matches an aid flow application conditional expression, for outputting requests for information in sequence to the user information transmitter-receiver 6 in accordance with the flow of the branch-type file of its aid flowchart to lead a final retrieval result, and a main memory 29 in which information is temporarily stored when analysis or processing of information is performed.

The above-described meta-keyword retrieval processing means 21, verb and object retrieval processing means 22, and aid flow retrieval processing means 23 are realized by, for example, CPU or the like.

The configuration and operation of each retrieval processing means will be explained here more concretely.

As shown in FIG. 1, the meta-keyword retrieval processing means 21 receives a keyword which a user enters from the user information transmitter-receiver 6, via the communication controller 4, and is composed of at least an information analysis portion 24 for determining whether or not the received keyword is a non-retrieval keyword, and a retrieval processing portion 25, when the determination by the information analysis portion 24 is a non-retrieval keyword, for reading an associated retrieval keyword from the meta-keyword database 13 to perform retrieval processing. If the received keyword is not accumulated as a non-retrieval keyword in the meta-keyword database 13, the information analysis portion 24 determines that the received keyword is not a non-retrieval keyword. Then the retrieval processing portion 25 identifies the received keyword as a retrieval keyword to perform retrieval processing.

The verb and object retrieval processing means 22 receives a keyword which the user enters from the user information transmitter-receiver 6, via the communication controller 4, and is composed of at least an information analysis portion 24 for analyzing whether the received keyword is a verb or object, an input/output processing portion 26, when the analysis result by the information analysis portion 24 is either a verb or an object, for reading the other object or verb associated therewith from the verb and object database 14 and outputting it to the user information transmitter-receiver 6, and a retrieval processing portion 25, after the output, for receiving the other verb or object which the user enters from the user information transmitter-receiver 6 to thereby obtain both of the verb and object and for obtaining a retrieval keyword based on the combination of the verb and object to perform retrieval processing.

Even when a verb and object are directly entered by the user at a time, the retrieval processing portion 25 can obtain a retrieval keyword associated therewith to perform retrieval.

The aid flow retrieval processing means 23 is composed of at least a history analysis portion 27 for analyzing whether or not a retrieval history of the user matches any one of patterns of aid flowcharts with reference to the user customizing database 16 and the Cookie function of the Web browser or the file holding registry and environmental variable of the operating system (OS), and an input/output processing portion 26, when the matching of the retrieval pattern is determined by the history analysis portion 27, for outputting requests for information in sequence in accordance with the pattern of the aid flowchart.

The history analysis portion 27, when receiving an entered keyword from the user, reads the retrieval history recorded on the Cookie or the like and determines whether or not an aid flow identification number exists in the history of the last access to the site. When the aid flow identification number exists, the history analysis portion 27 determines that an aid flowchart is in use, and further analyses its identification line number to determine whether the identification number is a query file or a result file, what step of query file is outputted, and the like.

Further, the history analysis portion 27, after determination of absence of the aid flow identification number in the retrieval history, reads past retrieval keywords from retrieval logs in the user customizing database 16 and adds the retrieval keyword this time to determine whether or not the keywords match an aid flow application conditional expression of an aid flowchart.

When determining that there is no aid flow identification number in the retrieval history and the keywords do not match the aid flow application conditional expressions, the history analysis portion 27 determines that it is impossible to apply an aid flowchart to this case.

The input/output processing portion 26 operates in accordance with the analysis result by the history analysis portion 27. More specifically, when the history analysis portion 27 determines that an aid flowchart is in application, the input/output processing portion 26 reads a branch number associated with a choice received from the user and outputs to the user a query file or a result file of the identification line number which the branch number shows.

On the other hand, when the history analysis portion 27 determines that the keywords match an aid flow application conditional expression, the input/output processing portion 26 outputs to the user a first query file from its aid flowchart.

When the history analysis portion 27 determines that no aid flowchart can be applied, the input/output processing portion 26 does not apply an aid flowchart and waits for next coming processing.

Further the aforesaid meta-keyword retrieval processing means 21, verb and object retrieval processing means 22, and aid flow retrieval processing means 23 are provided with a retrieval result formation portion 28 for processing the retrieval result into a predetermined format to output and display it to the user.

Figure 6:
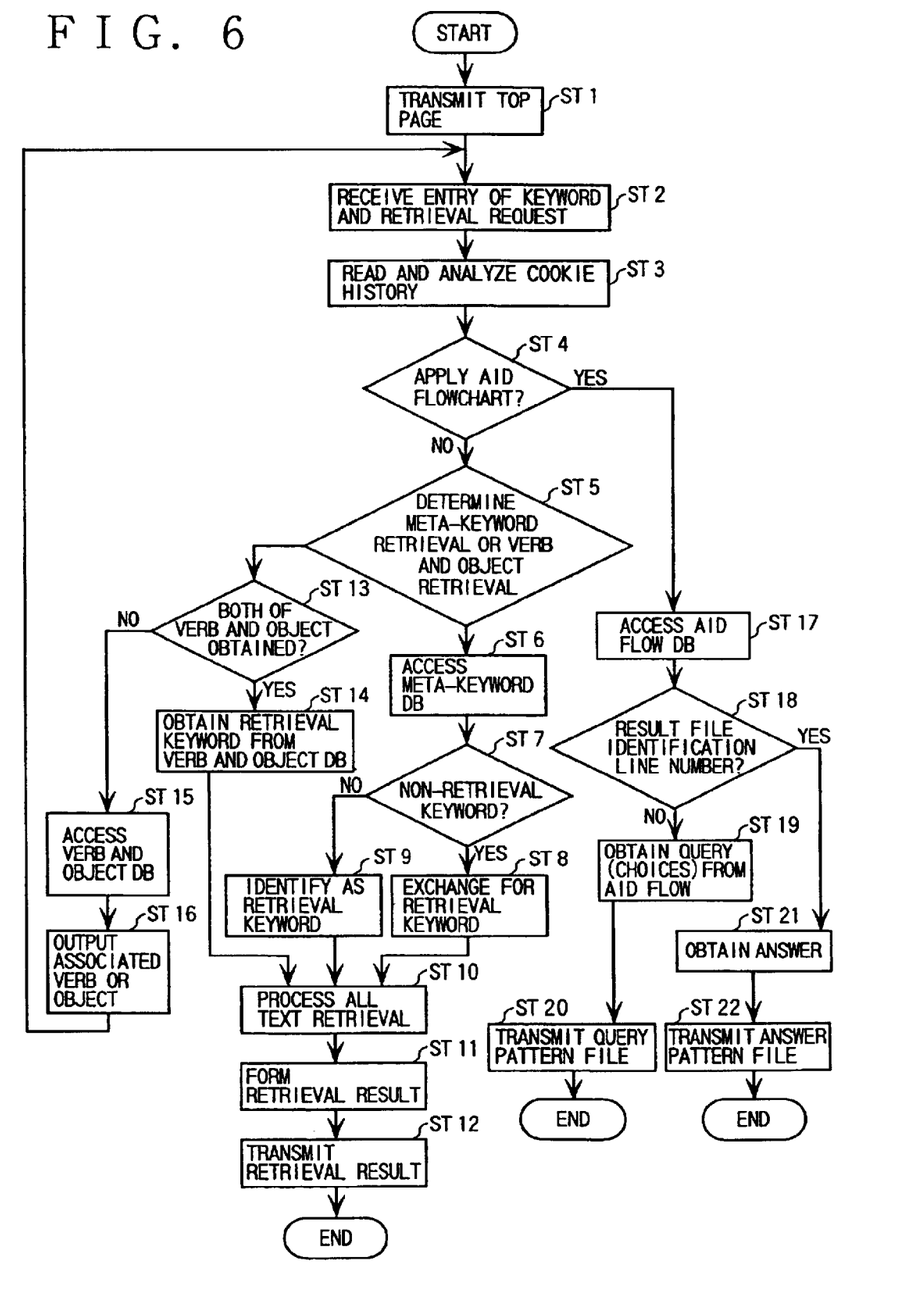
FIG. 6 is a flowchart showing operations of a law retrieval program according to the present invention.

Next, the operation of the law retrieval program which is recorded on the law retrieval apparatus 7 of the present invention to be readable will be explained in accordance with the flowchart in FIG. 6.

Figure 7:
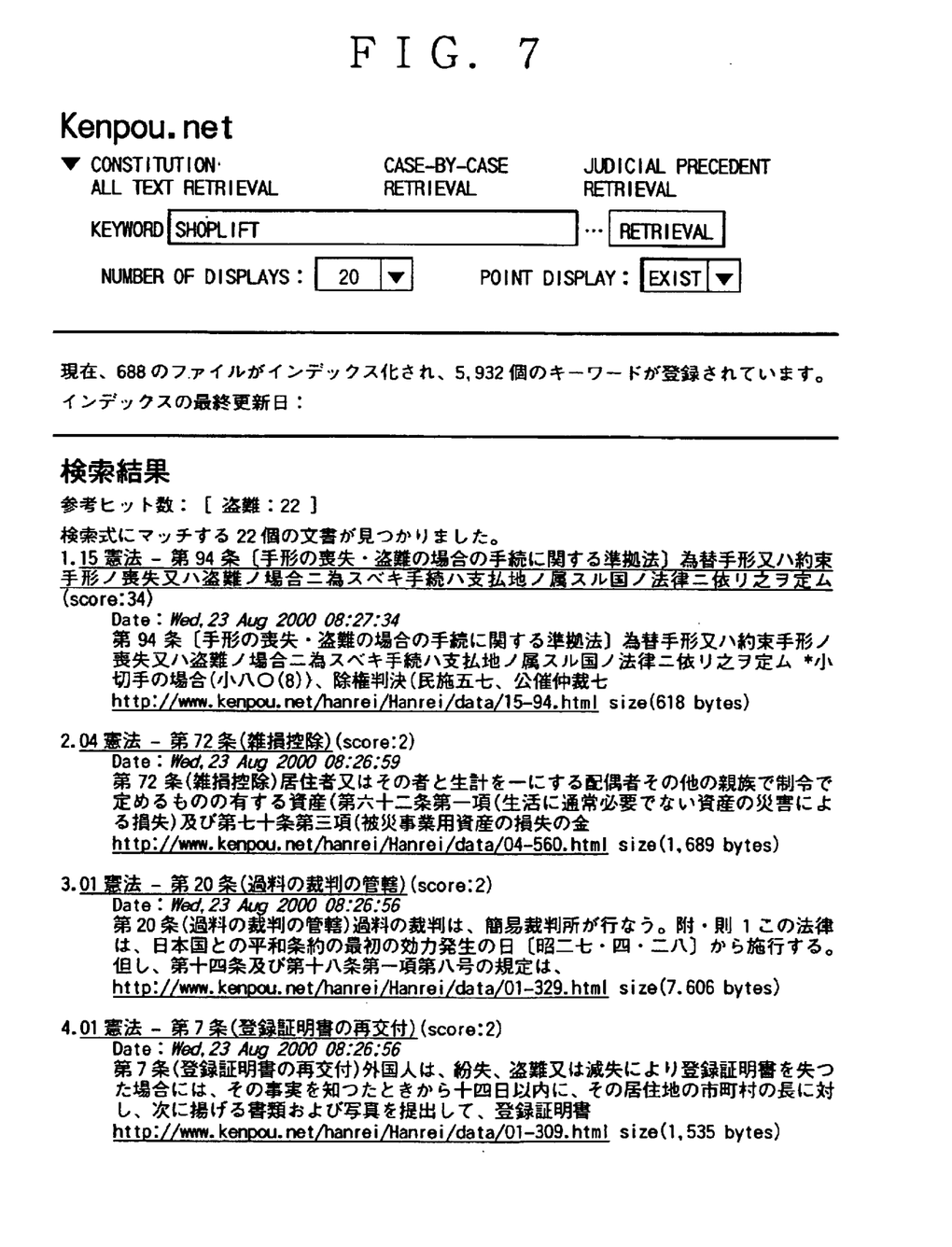
FIG. 7 is a pictorial view showing an example of a retrieval keyword input screen of a user information transmitter-receiver in this embodiment.

First, in step 1, when a user gets access to the law retrieval apparatus 7 via the Internet 5 or the like, a top page of a law retrieval site is transmitted to the user. Next, in step 2, the user enters his user identification number and a keyword on a keyword input screen as shown in FIG. 7, which is received as a retrieval request. Then, in step 3, the history analysis portion 27 reads a past history from means including a history holding function such as the Cookie or the like to analyze it. In step 4, whether or not an aid flowchart is applied is determined based on the analysis result. In other words, it is determined whether an aid flowchart has been already applied or the keyword matches an aid flow application conditional expression and thus the application of its aid flowchart is made start.

When the determination in step 4 is NO, that is, when no aid flowchart is in application and the keyword does not match an aid flow application conditional expression, the flow advances to step 5.

In step 5, the information analysis portion 24 determines which is applicable, "meta-keyword retrieval" by the meta-keyword retrieval processing means 21 or "verb and object retrieval" by the verb and object retrieval processing means 22 based on the entered keyword. This determination may be made by analyzing the sort of the entered keyword, but in this embodiment, it is possible to choose previously the use of the meta-keyword retrieval or the use of the verb and object retrieval on the retrieval keyword input screen which is provided to the user.

When the information analysis portion 24 determines that processing is performed by the meta-keyword retrieval, the flow advances to step 6, whereby the input/output processing portion 26 gets access to the meta-keyword database 13. In the input/output processing portion 26, the flow advances to step 7, thereby determining whether or not the entered keyword is a non-retrieval keyword. The method of this determination retrieves whether or not the non-keyword exists in the meta-keyword database 13.

In step 7, when the determination is YES, that is, when the non-retrieval keyword exists, the flow advances to step 8, whereby the input/output processing portion 26 reads a retrieval keyword associated with the non-retrieval keyword from the meta-keyword database 13 to perform replacement. The number of the retrieval keywords associated with the non-retrieval keyword is not limited to one, but can be plural. In the case of plural, all of them replace the non-retrieval keyword as the retrieval keywords to be used retrieval processing thereafter.

In step 7, when the determination is NO, that is, when the non-retrieval keyword does not exist, the flow advances to step 9, whereby the information analysis portion 24 determines that the aforesaid non-retrieval keyword is a retrieval keyword, which is used for retrieval processing thereafter.

In step 10, the retrieval processing portion 25 performs full text retrieval processing based on the retrieval keyword obtained in step 8 or in step 9. Further, the flow advances to step 11, the retrieval result formation portion 28 creates a retrieval result in a predetermined format, and transmits the retrieval result to the user information transmitter-receiver 6 in step 12.

On the other hand, returning to step 5, when the information analysis portion 24 determines that processing is performed by the verb and object retrieval, the flow advances to step 13, whereby the information analysis portion 24 determines whether or not both a verb and object have been obtained.

When the determination is YES in step 13, that is, when the information analysis portion 24 determines that both the verb and object have been obtained, the flow advances to step 14, whereby the input/output processing portion 26 gets access to the verb and object database 14 to obtain a retrieval keyword associated with a combination of the designated verb and object. Subsequently, the flow advances to step 10, whereby the retrieval processing portion 25 performs full text retrieval and further the flow advances to step 11, whereby the retrieval result formation portion 28 creates a retrieval result in a predetermined format to output it to the user information transmitter-receiver 6 in step 12.

On the other hand, when the determination is NO in step 13, that is, when the information analysis portion 24 determines that only one of verb and object has been obtained, the flow advances to step 15, whereby the input/output processing portion 26 gets access to the verb and object database 14. Then the flow advances to step 16, whereby the input/output processing portion 26 reads a verb or object associated with the entered keyword from the verb and object database 14 to output it to the user information transmitter-receiver 6. The number of verbs or objects associated with the entered object or verb is not limited to one but, if anything, a plurality of them often exist. Accordingly, when a plurality of associated verbs or objects exist, the input/output processing portion 26 reads all of them to output them to the user, thereby allowing the user to make a choice. Thereafter, the flow returns to step 2 and waits entry of the associated other verb or object by the user.

When the other verb or object is entered by the user, the determination is YES in step 13, that is, the information analysis portion 24 determines that both the verb and object are complete, thereby the flow advancing to step 14, to obtain a retrieval keyword associated with a combination of the aforesaid verb and object. Thereafter, the flow advances to step 10, whereby the retrieval processing portion 25 performs full text retrieval processing based on the retrieval keyword obtained from the verb and object. Thereafter, the flow advances to step 11, whereby the retrieval result formation portion 28 arranges a retrieval result in a predetermined format, and the input/output processing portion 26 transmits the retrieval result to the user information transmitter-receiver 6 via the Internet 5.

Net, returning to step 4, when the determination is YES, that is, when the history analysis portion 27 determines that an aid flowchart is in application or the application thereof is started, the flow advances to step 17, whereby access is made to the aid flow database 15.

Then the flow advances to step 18, the history analysis portion 27 analyses the history information to thereby analyze the branch number in the case of application of the aid flowchart. More specifically, the history analysis portion 27 analyses whether the branch number associated with the choice which the user has chosen is a number directing the advance to an identification line number of a query file or a number directing the advance to an identification line number of a result file. In this embodiment, it is determined whether or not the branch number is an identification line number of a result file, so that when the value of the first digit of the branch number is "9", the number is determined to be an identification line number of a result file, and when the number is a value other than "9", the number is determined to be an identification line number of a query file.

When the determination is NO in step 18, that is, when the history analysis portion 27 determines that the chosen branch number is an identification line number of a query file because the value of the first digit thereof is not "9", the flow advances to step 19, whereby the input/output processing portion 26 reads a query file of an applicable identification line number from the aid flow database 15. Thereafter, the flow advances to step 20, whereby the query file in the HTML format is outputted to the user.

On the other hand, when the determination is YES in step 18, that is, when the history analysis portion 27 determines that the chosen branch number is an identification line number of a result file because the value of the first digit thereof is "9", the flow advances to step 21, whereby the input/output processing portion 26 reads an answer file of an applicable identification line number from the aid flow database 15. Thereafter, the flow advances to step 22, whereby an HTML format result file or an HTML result file is outputted to the user information transmitter-receiver 6.

Incidentally, when processing is performed in each above-described processing portion, its processing information and storage expiration date are set in the Cookie. The information set in the Cookie is transmitted together when the retrieval result, the query file, or the answer file is transmitted from the law retrieval server 3 to the user information transmitter-receiver 6.

As described above, through the use of the law retrieval system 1, the law retrieval apparatus 7, and the law retrieval program of this embodiment, even if a slang word such as oyajigari, shabu (a slang word meaning a kind of drug), or the like is entered as a keyword, law provisions and judicial cases related thereto are easily retrieved by the meta-keyword retrieval processing means 21, so that a user can perform retrieval without prior knowledge of law terms difficult to understand and without worry of whether or not the keyword is a term usable as a retrieval keyword.

Further, various incidents to be law problems are split into verbs and objects and accumulated related to each other, thereby making it possible to obtain a retrieval keyword only from a verb and object such as "property-stolen" or the like to retrieve a related law provision and judicial case easily and speedily.

Further, when a retrieval pattern matches a pattern of an aid flowchart like a frequent retrieval pattern even though a user does not think a lot of retrieval keywords from the beginning, queries are provided in sequence in accordance with a branch-type query pattern of an aid flowchart to lead the user to a final conclusion, thereby bridging his knowledge gap on law, so that the user can easily perform retrieval without expert knowledge of law.

In the above-described embodiment, the user gets access to the law retrieval server 3 via the Internet 5 to use each database of the data storage means 2, but the present invention, not necessarily limited to this, can be carried out while changed as required.

Figure 8:
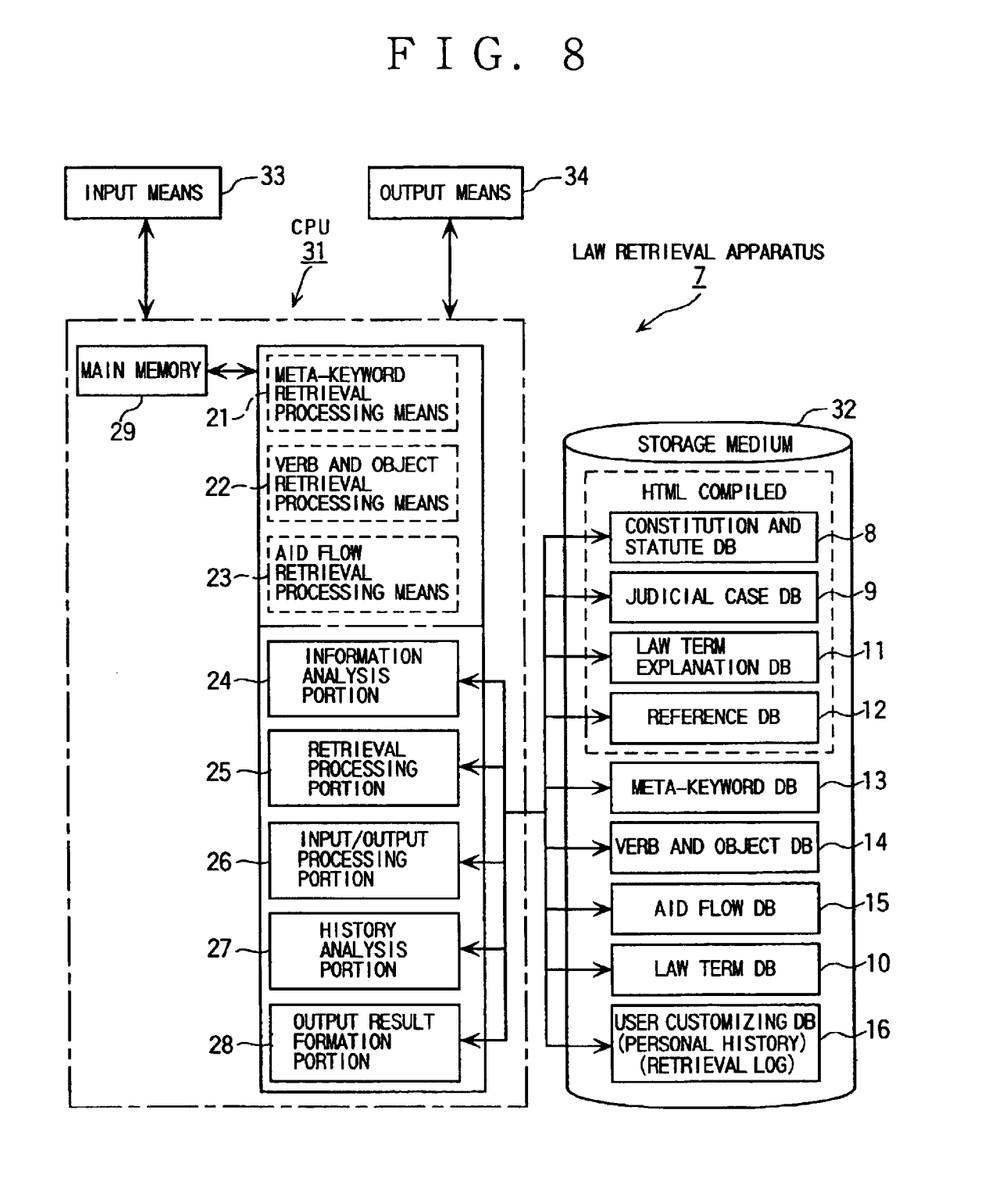
FIG. 8 is a system configuration diagram showing another embodiment of a law retrieval apparatus of the present invention.

For example, as shown in FIG. 8, it is also suitable that the law retrieval program is installed in a personal computer or the like and driven by a CPU 31, the data storage means 2 is stored in a storage medium 32 such as a hard disc, a CD-ROM, or the like, input means 33 such as a keyboard or a mouse is provided, and output means 34 such as a display or a printer is provided to thereby constitute the law retrieval apparatus 7.

Though the law retrieval program of this embodiment is used by accessing the law retrieval server 3 via the Internet 5 but, not limited to the embodiment like this, the law retrieval program may be provided by being recorded on a computer-readable record medium such as a CD-ROM, or may be provided by being transmitted to the user information transmitter-receiver 6 via the Internet 5.

Incidentally, though the illustration is not given, an interface specification such as a CGI or the like for linking the law retrieval server 3 and other programs is set in the law retrieval system 1.

What is claimed is:

1. A law retrieval system constituted by connecting a user information transmitter-receiver by which a user transmits a retrieval condition and receives a retrieval result and a law retrieval server for performing retrieval processing in sequence in accordance with the retrieval condition received from said user information transmitter-receiver, via a communication network, and by connecting data storage means, in which laws, judicial cases, and data required for retrieval are accumulated, to said law retrieval server, wherein said data storage means includes a constitution and statute database in which data of the constitution, laws, government orders and ministerial orders, is accumulated, a judicial case database in which data of judicial cases is accumulated, and at least one database out of a meta-keyword database constructed by associating non-retrieval keywords with retrieval keywords adequate for replacing the non-retrieval keywords, a verb and object database constructed by associating verbs and objects related to each other and associating retrieval keywords related to the combinations of the verbs and objects, and an aid flow database previously constructed as aid flowcharts by predicting information gathering query patterns for cases, and wherein said law retrieval server includes, in correspondence with said each database, at least one retrieval processing means out of meta-keyword retrieval processing means, when a received keyword is a non-retrieval keyword, for reading an associated retrieval keyword from said meta-keyword database to perform retrieval processing, verb and object retrieval processing means for reading a retrieval keyword associated with a combination of a received verb and object from said verb and object database to perform retrieval processing, and aid flow retrieval processing means, when a retrieval pattern by a received retrieval keyword matches a pattern of an aid flowchart, for transmitting requests for additional information in sequence in accordance with a flow of the aid flowchart.

2. A law retrieval apparatus, comprising: data storage means including a constitution and statute database in which data of the constitution, laws, government orders and ministerial orders, is accumulated, a judicial case database in which data of judicial cases is accumulated, and at least one database out of a meta-keyword database constructed by associating non-retrieval keywords words with retrieval keywords adequate for replacing the non-retrieval keywords, a verb and object database constructed by associating verbs and objects related to each other and associating retrieval keywords related to the combinations of the verbs and objects, and an aid flow database previously constructed as aid flowcharts by predicting information gathering query patterns for cases, and a law retrieval server including, in correspondence with said each database accumulated in said data storage means, at least one retrieval processing means out of mets-keyword retrieval processing means, when a received keyword is a non-retrieval keyword, for reading an associated retrieval keyword from said mets-keyword database to perform retrieval processing, verb and object retrieval processing means for reading a retrieval keyword associated with a combination of a received verb and object from said verb and object database to perform retrieval processing, and aid flow retrieval processing means, when a retrieval pattern by a received retrieval keyword matches a pattern of an aid flowchart, for transmitting requests for additional information in sequence in accordance with a flow of the aid flowchart.

3. A law retrieval apparatus, comprising:

a meta-keyword database constructed by associating non-retrieval keywords with retrieval keywords adequate for replacing the non-retrieval keywords;

an information analysis portion for determining whether or not a received keyword is a non-retrieval keyword;

a retrieval processing portion, when the determination by said information analysis portion is a non-retrieval keyword, for reading an associated retrieval keyword therewith from said meta-keyword database to perform retrieval processing, and wherein said meta-keyword database is set such that the non-retrieval keyword and a law term having meaning equal or similar thereto as the retrieval word associated with the non-retrieval keyword are one-to-one or one-to-many.

4. A law retrieval apparatus, comprising:

a verb and object database constructed by associating verbs and objects related to each other and by associating retrieval keywords related to combinations of them, a retrieval processing portion for obtaining a retrieval keyword associated with a combination of a received verb and object from said verb and object database to perform retrieval processing, an information analysis portion for analyzing whether a received keyword is a verb or object, and an input/output processing portion, when an analysis result by said information analysis portion is either a verb or object, for reading the other object or verb associated therewith from said verb and object data base and outputting it, wherein said retrieval processing portion receives the other verb or object after the output by said input/output processing portion to obtain a retrieval keyword associated with a combination of the verb and object from said verb and object database to perform retrieval processing.

5. A computer program, comprising:

an information analysis portion for analyzing whether a received keyword is a verb or object;

an input/output processing portion, when in analysis result by said information analysis portion is either a verb or object, for reading the other object or verb associated therewith from a verb and object database constructed by associating verbs and objects related to each other and associating retrieval keywords related to combinations of them, and outputting it; and a retrieval processing portion for receiving the other verb or object after the output by said input/output processing portion, and for reading a retrieval keyword associated with a combination of the verb and object from said verb and object database to perform retrieval processing.

6. A computer-readable record medium recording therein said program according to claim 5.

7. A computer-readable record medium, comprising: a recorded constitution and statute data in which data of the constitution, laws, government orders and ministerial orders, is accumulated, a recorded judicial case data in which data of judicial cases is accumulated, and at least one recorded data out of meta-keyword data constructed by associating non-retrieval keywords with retrieval keywords adequate for replacing the non-retrieval keywords, verb and object data constructed by associating verbs and objects related to each other and associating retrieval keywords related to the combinations of the verbs and objects, and aid flow data previously constructed as aid flowcharts by predicting information gathering query patterns for cases; and a recorded computer program including, in correspondence with said each database, at least one retrieval processing means out of meta-keyword retrieval processing means, when a received keyword is a non-retrieval keyword, for reading an associated retrieval keyword from a meta-keyword database to perform retrieval processing, verb and object retrieval processing means for reading a retrieval keyword associated with a combination of a received verb and object from a verb and object database to perform retrieval processing, and aid flow retrieval processing means, when a retrieval pattern by a received retrieval keyword matches a pattern of an aid flowchart, for transmitting requests for additional information in sequence in accordance with a flow of the aid flowchart.

* * * * *